(12) United States Patent
Ley

(10) Patent No.: US 9,752,629 B2
(45) Date of Patent: Sep. 5, 2017

(54) LIGHT WEIGHT CLUTCH ASSEMBLY

(71) Applicant: Ace Manufacturing and Parts Co., Sullivan, MO (US)

(72) Inventor: Brian R. Ley, Washington, MO (US)

(73) Assignee: ACE Manufacturing and Parts Co., Sullivan, MO (US)

( * ) Notice: Subject to any disclaimer, the term of this patent is extended or adjusted under 35 U.S.C. 154(b) by 279 days.

(21) Appl. No.: 14/565,987

(22) Filed: Dec. 10, 2014

(65) Prior Publication Data

US 2016/0169296 A1   Jun. 16, 2016

(51) Int. Cl.
*F16D 13/48* (2006.01)
*F16D 43/10* (2006.01)
*F16D 13/38* (2006.01)

(52) U.S. Cl.
CPC ............. *F16D 43/10* (2013.01); *F16D 13/48* (2013.01); *F16D 13/385* (2013.01)

(58) Field of Classification Search
CPC ........ F16D 13/385; F16D 13/48; F16D 13/42; F16D 2023/126; F16D 43/10
See application file for complete search history.

(56) References Cited

U.S. PATENT DOCUMENTS 3,892,302 A * 7/1975 Rist .................. F16D 25/08
                                             192/70
4,036,338 A * 7/1977 Linn ................. F16D 13/385
                                             192/113.34
5,785,163 A * 7/1998 Bell .................. F16D 13/70
                                             192/105 C

* cited by examiner

*Primary Examiner* — Huan Le
(74) *Attorney, Agent, or Firm* — David E. Crawford; Crawford IP Law

(57) ABSTRACT

A centrifugal clutch assembly. The clutch assembly has a cover adapted for connecting to a driving member extending along a central axis and a pressure plate coaxially mounted on the cover for axial movement relative to the cover. The assembly includes a friction disc adapted for connection to a driven member coaxially mounted adjacent the pressure plate. The assembly has a lever support mounted on and having a hardness greater than the pressure plate. The clutch assembly includes a lever pivotally mounted on the lever support and reacting against the cover to move the pressure plate into and out of engagement with the friction disc. The lever is shaped to apply more clamping force to the pressure plate as the clutch assembly turns faster about the central axis.

18 Claims, 12 Drawing Sheets

LIGHT WEIGHT CLUTCH ASSEMBLY

BACKGROUND

The present invention generally relates to clutch assemblies, and more particularly, to a light weight clutch assembly having improved durability and performance.

Vehicle clutches operate to selectively disengage an engine from a driven shaft for starting the engine and stopping the vehicle while in gear, and changing gears while in motion. When engaged, the clutches connect the engine and driven shaft so they turn in unison. Conventional clutches include a cover assembly having a cover and an annular pressure plate connected to the cover for simultaneously rotating with the cover. The cover is attached to a flywheel so the cover and pressure plate are spaced from the flywheel. A driven shaft extends through the cover assembly and is connected to a friction disc positioned between the pressure plate and flywheel. When the clutch is disengaged, the flywheel rotates independently from the driven shaft. The friction disc is splined to the driven shaft so the disc rotates simultaneously with the shaft, but so the disc is able to slide axially on the shaft. Springs between the cover and pressure plate force the plate toward the flywheel, clamping the friction disc against the flywheel so the driven shaft turns with the flywheel. The clutch is disengaged by a mechanical linkage that pushes levers pivotally mounted between the cover and the pressure plate. As the levers are pushed, the pressure plate moves toward the cover to disengage the clutch.

In some centrifugal clutches, the levers are formed so their mass is axially offset from the pins that connect them to the cover and pressure plate. Centrifugal forces pivot the levers outward due the offset masses when the clutch is spinning to increase clamping force. The cover must endure substantial reaction forces applied by the levers and springs. Further, the reaction forces can deflect the cover relative to the flywheel, reducing overall efficiency of the clutch. Conventionally, the cover is made from stamped steel and configured to resist the bending forces. However, over time the cover can fail as a result of the reaction forces. Moreover, the large size and weight of the cover undesirably increases its inertia. Thus, there is a need for a clutch cover assembly comprising a light weight cover that is capable of withstanding operational loading.

Conventional light weight pressure plates are milled from aluminum. Lever supports for connecting the levers to the pressure plate are machined integrally with the plate. Over time, abutting edges of the cover abrade the supports. Further, the integral lever supports crack at their base and eventually fail due to cyclical bending loads. In addition, the aluminum pressure plates tend to warp due to thermal loading from adjacent heat shields. Accordingly, there is a need for a clutch cover assembly having a light weight pressure plate that is capable of enduring operational loading.

SUMMARY

In one aspect, a centrifugal clutch assembly comprises a cover adapted for connecting to a driving member extending along a central axis, a pressure plate coaxially mounted on the cover for axial movement relative to the cover, and a friction disc adapted for connection to a driven member coaxially mounted adjacent the pressure plate. In addition, the clutch assembly includes a lever support mounted on the pressure plate. The lever support has a hardness greater than the pressure plate. The clutch assembly also has a lever pivotally mounted on the lever support and reacting against the cover to move the pressure plate into and out of engagement with the friction disc. The lever is shaped to apply more clamping force to the pressure plate as the clutch assembly turns faster about the central axis.

In another aspect, a centrifugal clutch assembly comprises a cover adapted for connecting to a driving member extending along a central axis and having an opening. The clutch assembly includes a pressure plate coaxially mounted on the cover for axial movement relative to the cover. The pressure plate has a lever support extending from it. The Clutch assembly also has a friction disc adapted for connection to a driven member coaxially mounted adjacent the pressure plate and a lever extending through the opening in the cover. The lever is pivotally mounted on the lever support of the pressure plate and reacts against the cover to move the pressure plate into and out of engagement with the friction disc. The lever is shaped to apply more clamping force to the pressure plate as the clutch assembly turns faster about the central axis. Further, the clutch includes opposing pillars mounted on opposite sides of the opening in the cover and a strap bridging the pillars and spanning the opening in the cover. A pressure pin is fastened to the strap and pivotally connected to the lever.

Other aspects of the present disclosure will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
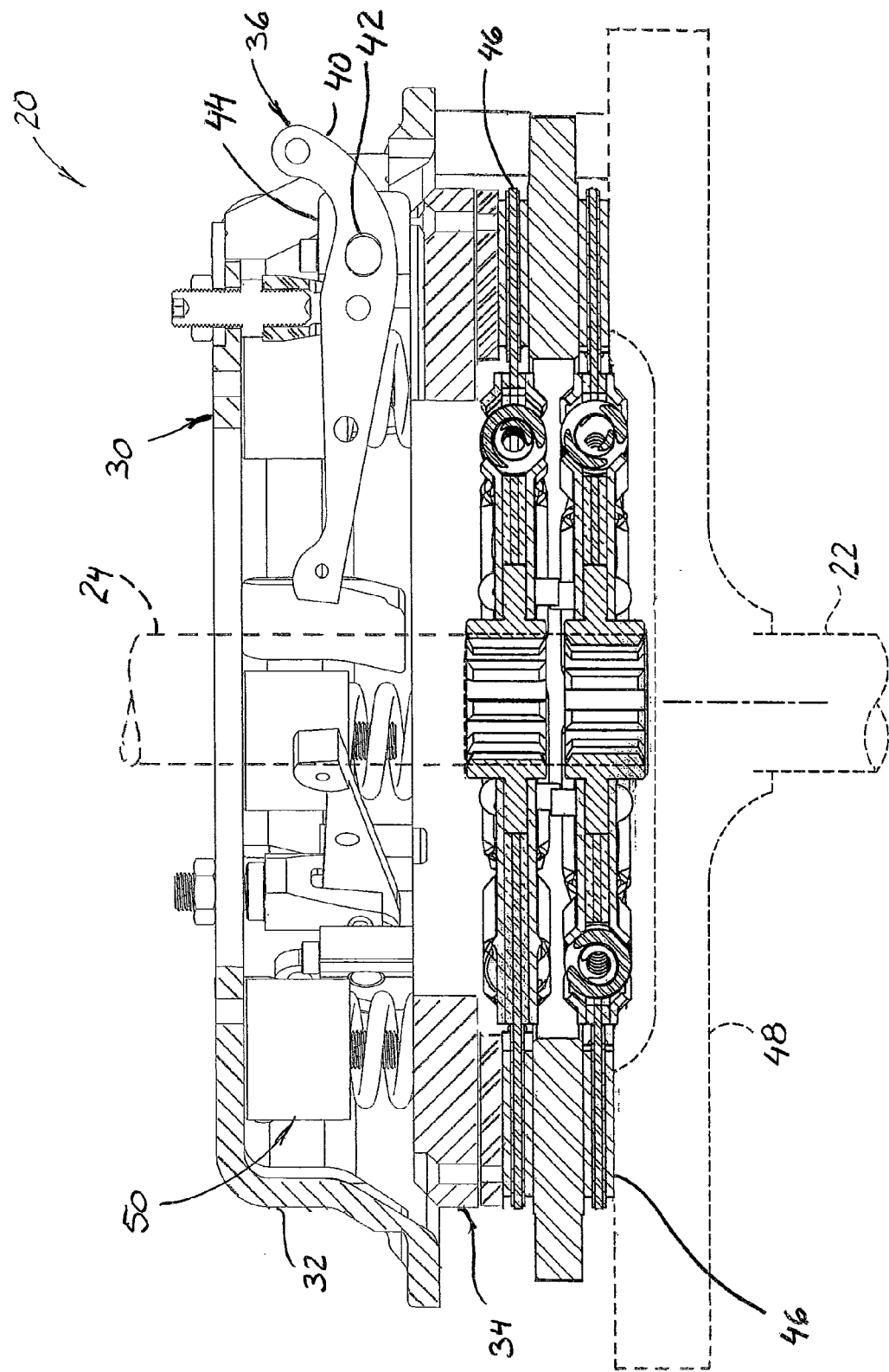
FIG. 1 is a cross section of a clutch as described below.

Referring to FIG. 1, a clutch assembly is designated in its entirety by the reference number 20. The clutch assembly 20 selectively disengages an input or driving shaft 22 from an output or driven shaft 24, allowing them to turn independently. The clutch assembly 20 includes a cover assembly (generally designated by 30 in FIG. 2), having a cover 32, a pressure plate (generally designated by 34), and a lever assembly (generally designated by 36) mounted on the pressure plate.

The lever assembly 36 includes a lever 40 pivotally mounted on a pin 42 extending between lever supports 44 connected to the pressure plate 34. When the clutch is engaged, the pressure plate 34 moves away from the cover 32 to clamp a friction disc 46 between the pressure plate and a flywheel 48 so the input shaft 22 and output shaft 24 are coupled and turn in unison. Spring assemblies, generally designated by 50, are provided between the cover 32 and pressure plate 34 to bias the pressure plate into clamping engagement with the friction discs 46. Bolts (not shown) connect the cover 32 to the flywheel 48 so they rotate in unison. The friction disc 46 and driven shaft 24 are joined by a spline connection so they rotate in unison but the disc is free to move axially with respect to the shaft.

Figure 3:
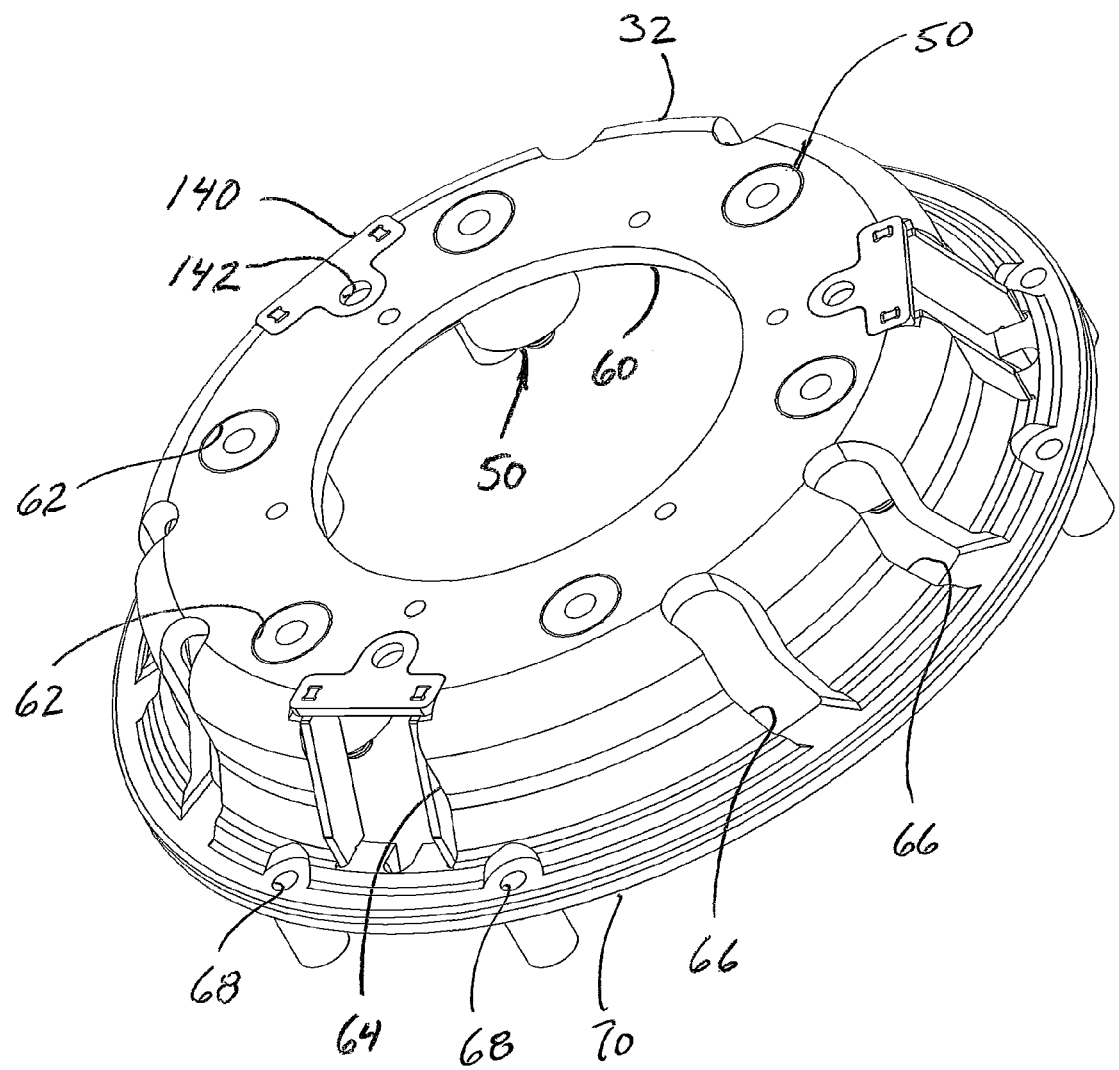
FIG. 3 is a perspective of a cover of the assembly shown in FIG. 2.
Figure 4:
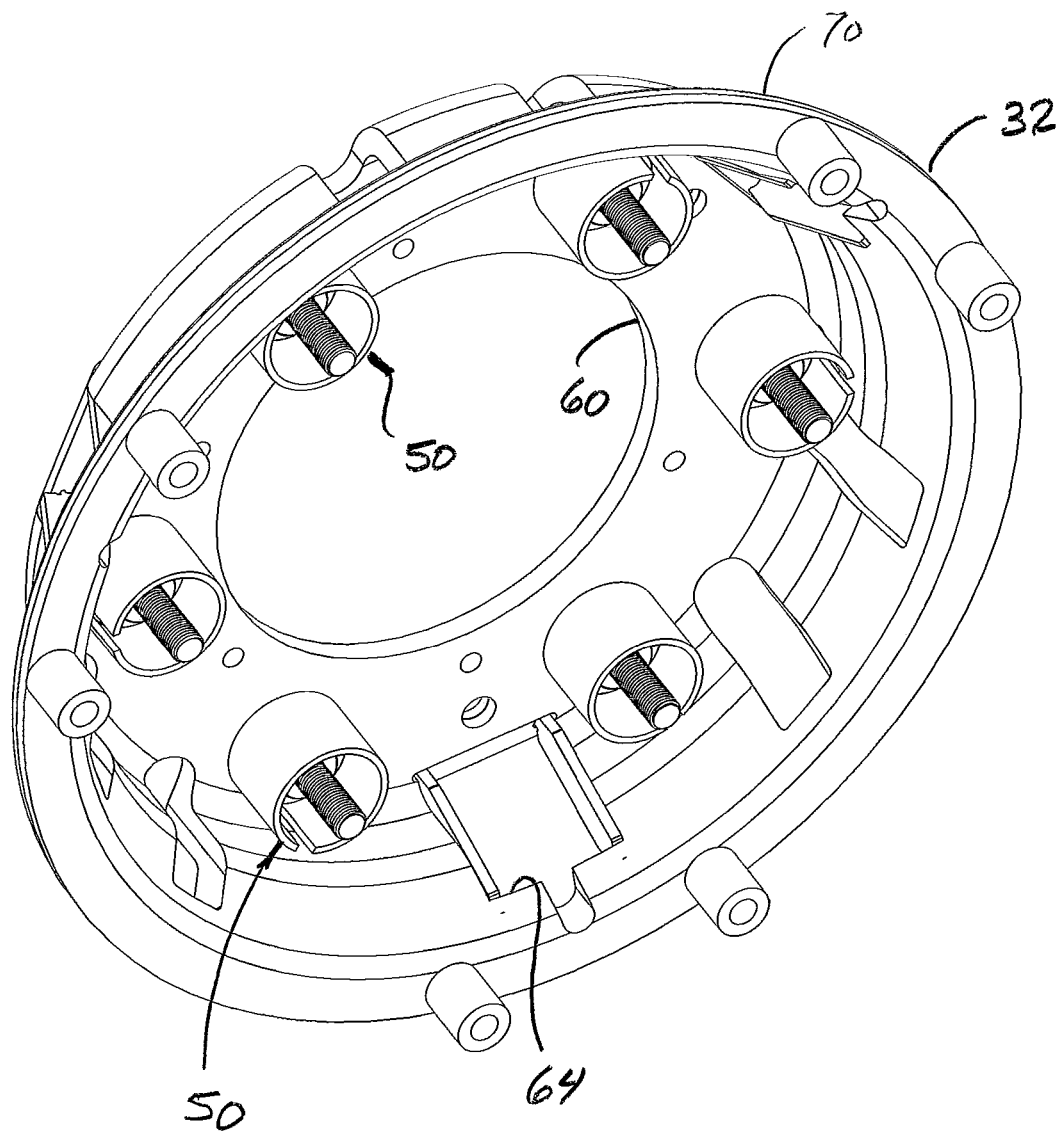
FIG. 4 is an opposite perspective of the cover of FIG. 3.

As illustrated in FIGS. 3 and 4, the cover 32 has a central opening 60 sized to permit the driven shaft 22 to pass through the cover to the friction discs 46 (FIG. 1). Six equally spaced openings 62 surrounding the central opening 60 are sized and shaped for receiving corresponding ends of the spring assemblies 50. Three larger openings 64 extend axially along the cover 32. These openings 64 are sized and shaped for receiving the lever assemblies 36. Two cooling holes 66 extend axially along the cover 32 between each adjacent pair of lever assembly openings 64. Although the holes 66 may have other shapes without departing from the scope of the present invention, in one embodiment the holes 66 are obliquely shaped and aligned to draw air into the cover assembly 20 so the air flows over the pressure plate 34. The air cools the pressure plate 34 to reduce warping caused by thermal loading when the clutch is engaged and disengaged. Bolt holes 68 extend through a flange 70 of the cover 32 for bolting the cover to the flywheel 48 (FIG. 1). The cover 32 is made from an aluminum forging. Other suitable high strength-to-weight-ratio materials (e.g., titanium) may be used without departing from the scope of the present invention. The forged aluminum cover 32 reduces weight increases rigidity compared to conventional stamped steel designs.

Figure 2:
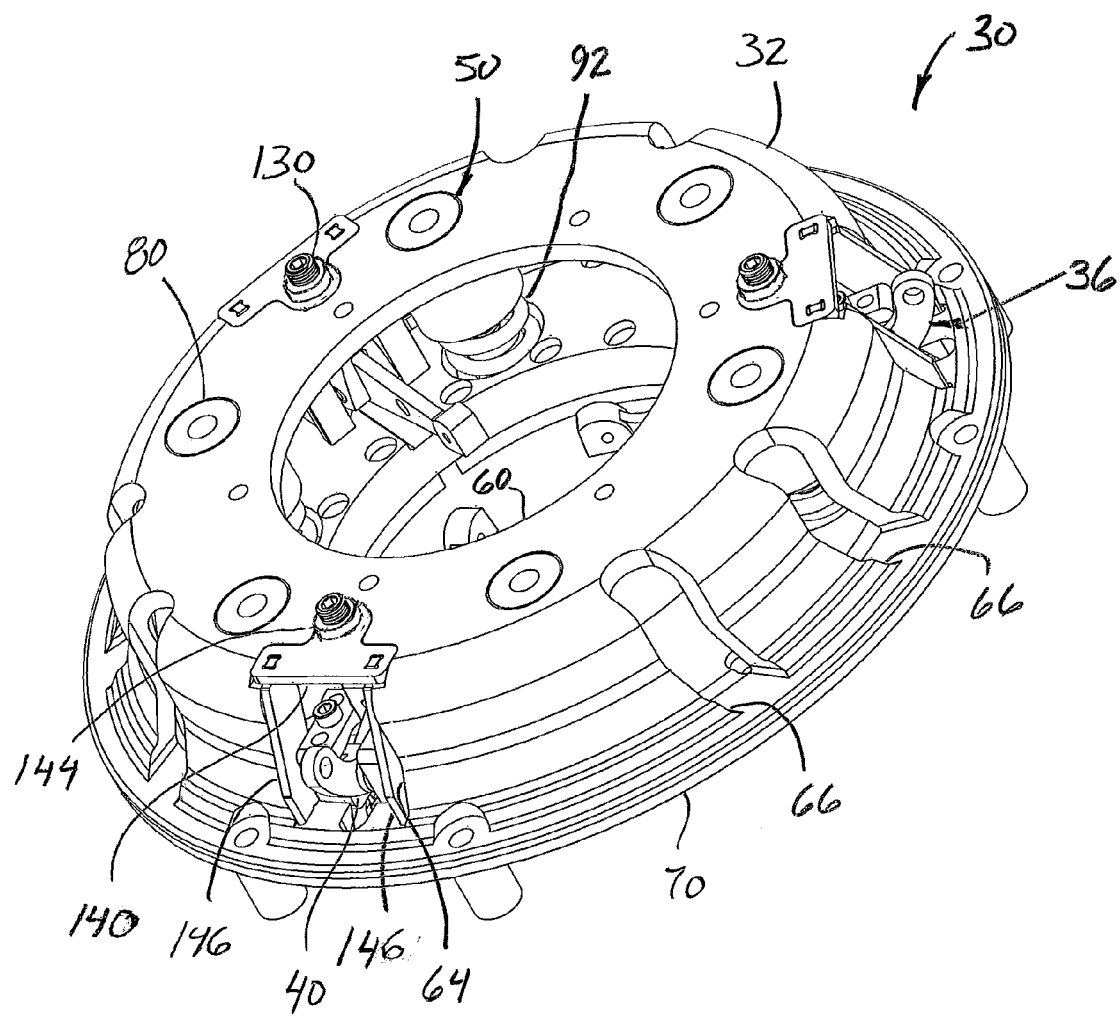
FIG. 2 is a perspective of a cover assembly of the clutch shown in FIG. 1.
Figure 5A:
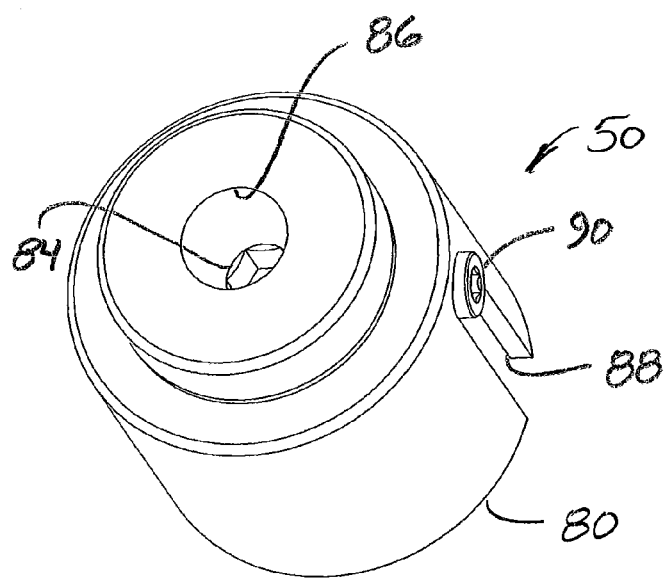
FIGS. 5a and 5b are opposite perspectives of a spring assembly of the cover shown in FIG. 4.
Figure 5B:
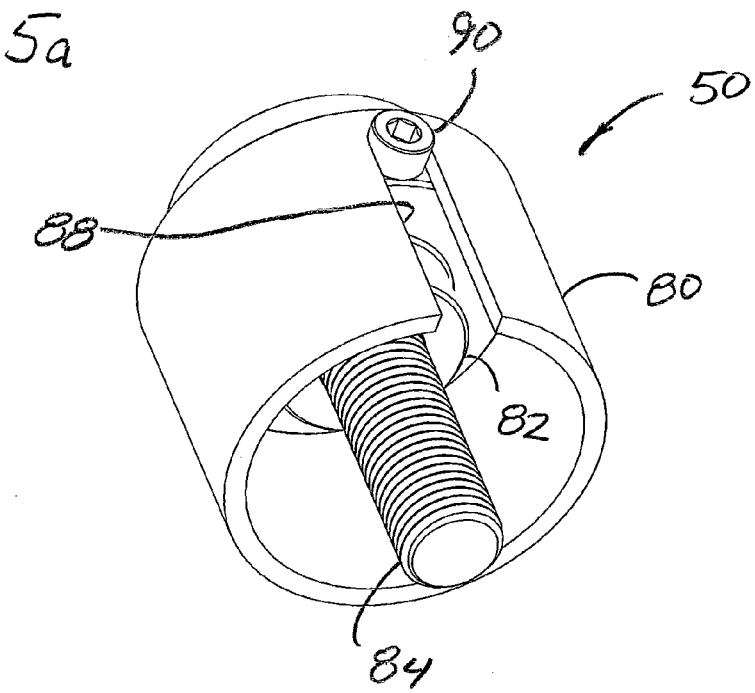
Figure 6A:
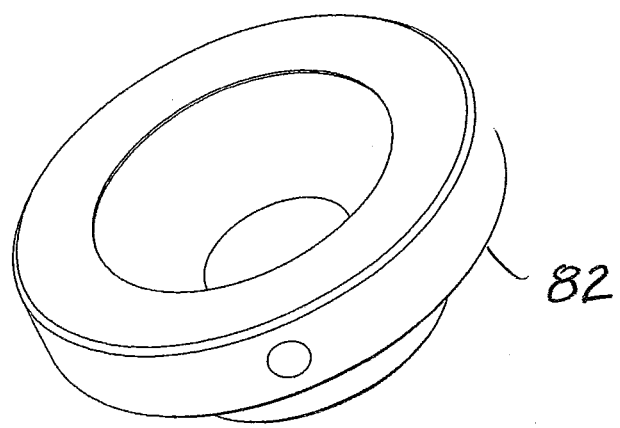
FIGS. 6a and 6b are opposite perspectives of a spring seat of the spring assembly shown in FIGS. 5a and 5b.
Figure 6B:
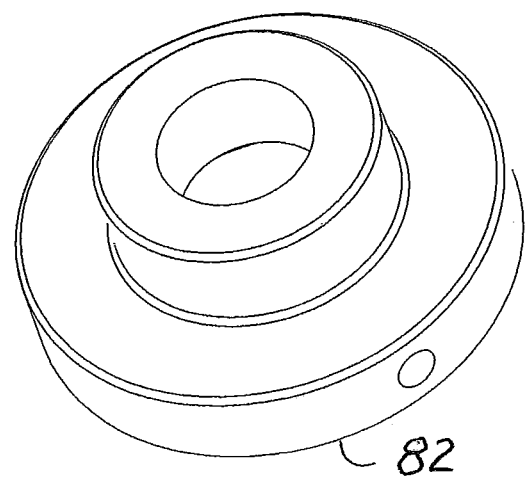

As shown in FIGS. 5a and 5b, each of the spring assemblies 50 includes an aluminum cup 80 press fit into a corresponding opening 62 (FIGS. 2 & 3) in the cover 32. A spring seat 82 (FIGS. 6a & 6b) is slidably received in the cup 80 to a depth determined by a jackscrew 84 positioned in the cup 80. A central opening 86 is provided in the cup 80 allowing access to the jackscrew 84 for adjusting the spring seat 82 position. The cup 80 has a slot 88 extending axially down one side that receives a screw 90 threaded into a side of the spring seat 82 to prevent the spring seat from rotating as the jackscrew 84 turns in the cup to adjust the spring seat position. The cup 80 is sized for receiving an end of a spring 92 as shown in FIG. 2. Optimally, the spring assemblies 50 may be easily adjusted. A standard Allen wrench may be used to turn the jackscrew 84 to move the spring seat 82 up in the cup 80, compressing the spring 92 and increasing pressure plate 34 loading. Rotating the Allen wrench in an opposite direction reduces plate load.

Figure 7:
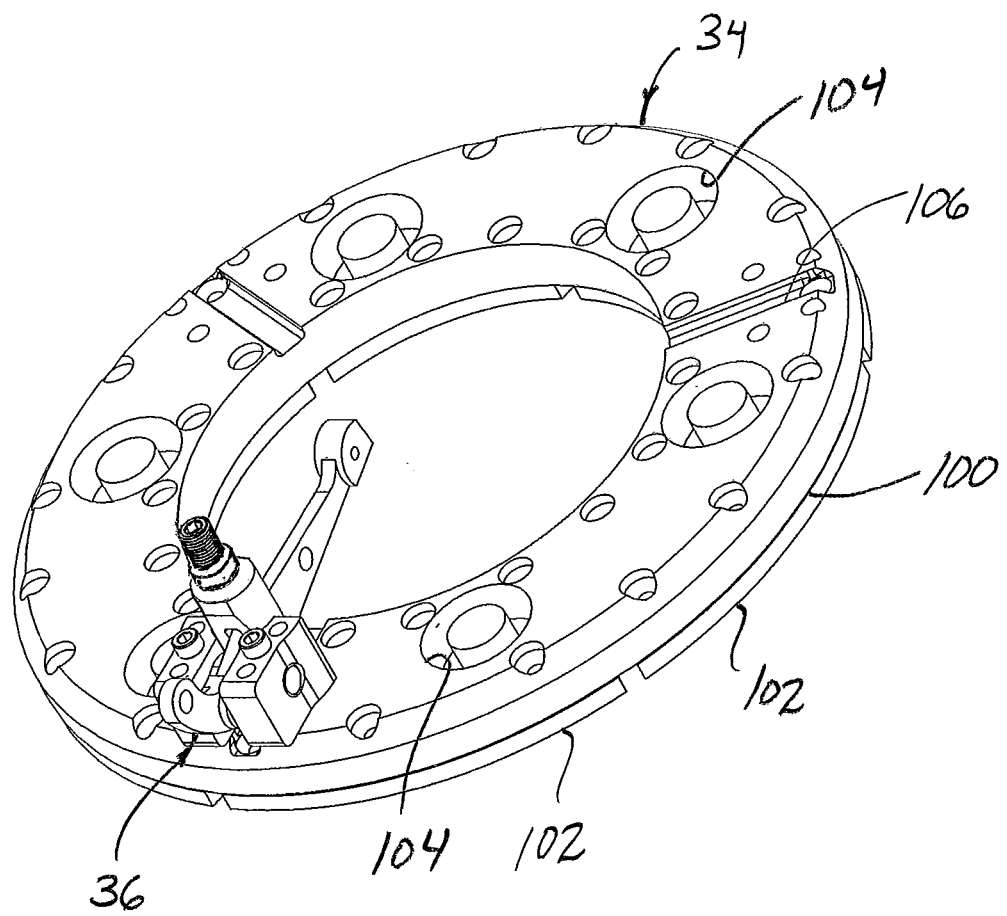
FIG. 7 is a perspective of a pressure plate of the cover assembly shown in FIG. 2 having one lever assembly installed.
Figure 8:
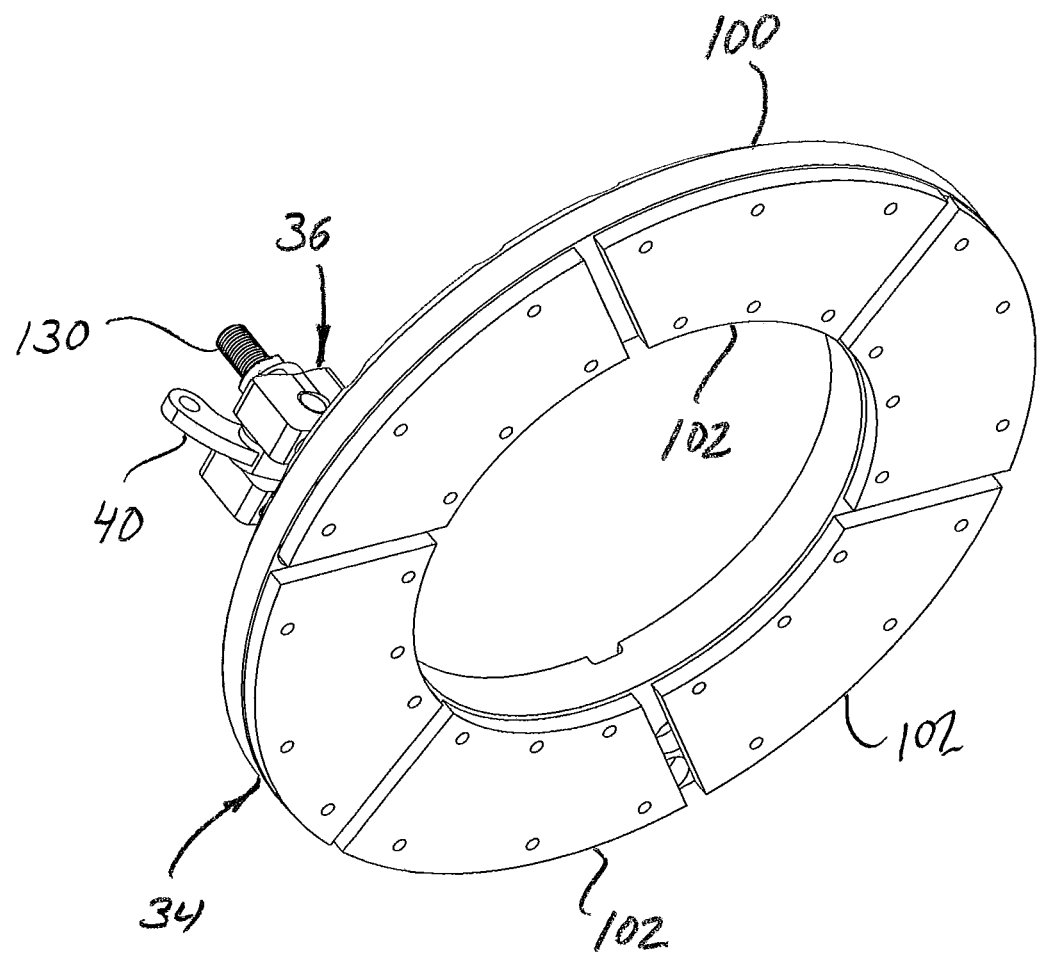
FIG. 8 is an opposite perspective of the pressure plate and lever assembly shown in FIG. 7.

FIGS. 7 and 8 illustrate the pressure plate 34 with one lever assembly 36 mounted on it. The pressure plate 34 comprises an annular aluminum ring 100 having steel pressure pads 102 attached (e.g., with screws) to one face for engaging the friction disc 46 (FIG. 1). Six equally spaced openings 104 formed on an opposite face of the ring 100 shown in FIG. 7 are sized and shaped for receiving ends of the springs 92 (FIG. 2). Thus, the springs 92 are captured between the cups 80 mounted on the cover 32 as shown in FIG. 4 and the corresponding spring openings 104 formed in the pressure plate ring 100 as shown in FIG. 7. Three slots 106 are machined in the ring 100 to provide clearance for the levers 40 as will be described below.

Figure 9:
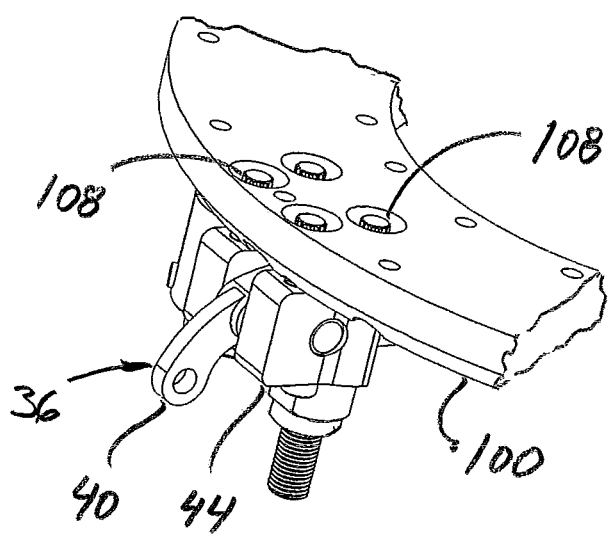
FIG. 9 is a perspective of a lever assembly of the cover assembly shown in FIG. 2.
Figure 10:
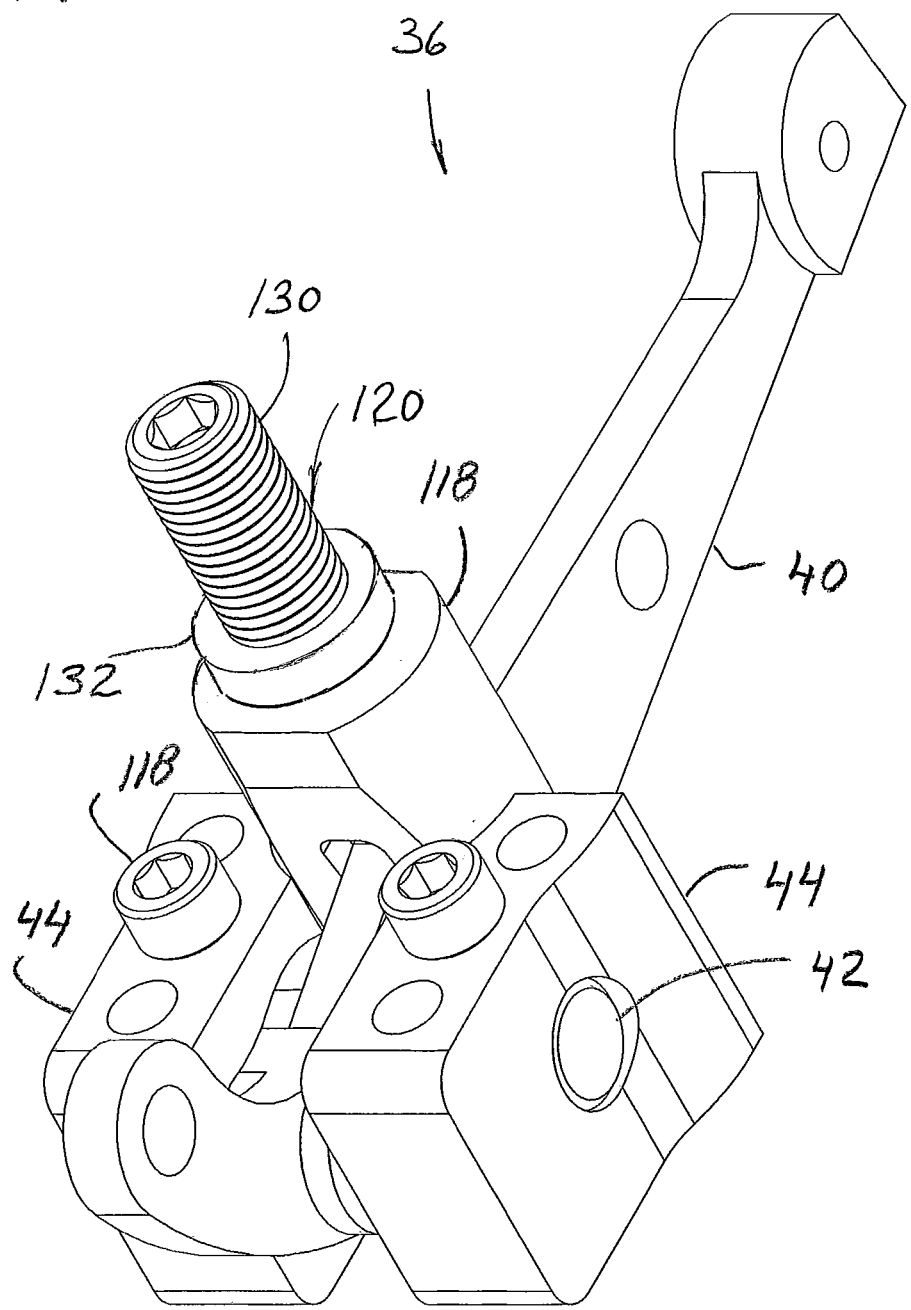
FIG. 10 is a perspective of lever supports of the lever assembly of FIG. 9.
Figure 11:
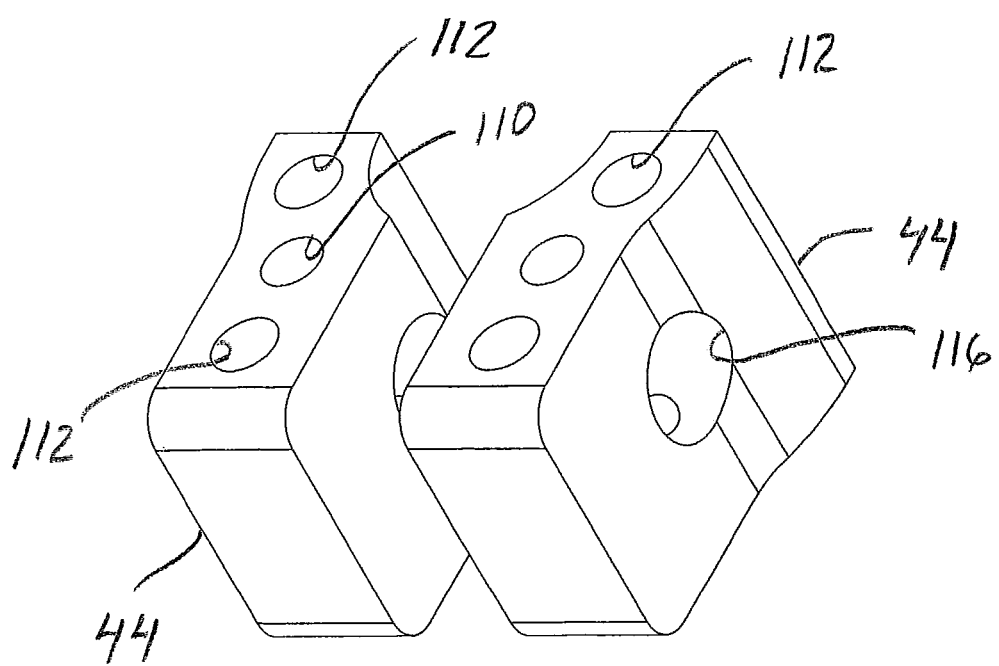
FIG. 11 is a fragmentary perspective of the pressure plate of FIG. 7 having pressure pads removed for clarity of explanation.
Figure 12:
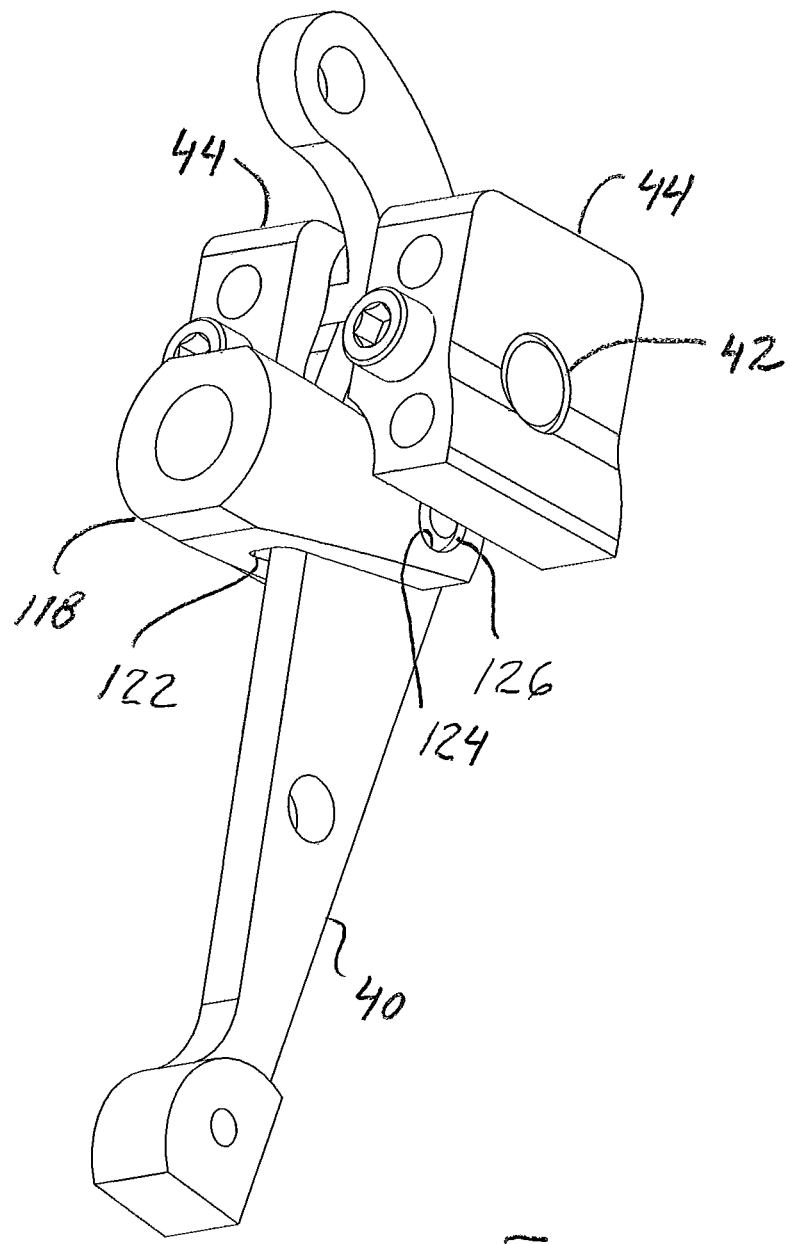
FIG. 12 is an opposite perspective of the lever assembly shown in FIG. 9.

Each lever assembly 36 comprises a pair of lever supports 44 fastened to the pressure plate 34 with bolts 108 as illustrated in FIG. 9. High-strength bolts having a close tolerance fit are used to fasten the lever supports 44 to the plate 34 so the lever supports are precisely located. As shown in FIGS. 10 and 11, the lever supports 44 are machined from steel to have a central axial hole 110 and two outer axial holes 112. The bolts 108 are threaded into the two outer holes 112 in the each support 44 to fasten the support to the aluminum ring 100. A lateral hole 116 extending through each support 44 and intersecting the central axial hole 110 receives the pin 42 for pivotally fastening the lever 40 to the pressure plate 34. A fastener 118 threaded into the central axial hole 110 holds the pin 42 in position in the lateral hole 116. By matching the hardnesses of the lever 40 and pin 42, a bushing found in the conventional lever assemblies is eliminated. By eliminating the bushing contact area between the lever 40 and pin 42 is increased, resulting in smoother operation. As shown in FIGS. 11 and 12, an end of the support 44 is machined to accommodate a clevis 118 of an axially extending pressure pin, generally designated by 120. As will be appreciated by those skilled in the art, the lever supports 44 are identical but inverted with respect to each other. As further illustrated in FIG. 12, the clevis 118 includes a slot 122 for receiving the corresponding lever 40 and a lateral hole 124 intersecting the slot 122 for receiving a clevis pin 126 for pivotally connecting the lever to the clevis. The pin 126 is captured between the supports 44 to prevent the pin becoming separating from the lever supports. As shown in FIG. 10, a stud 130 is threadably connected to the clevis 120 for fastening the pressure pin 120 to the cover 32. The stud 130 includes an integral shoulder 132 for positioning the stud when connected to the cover 32 as will be explained below. The pressure pins described above permits the stud 130 height to be adjusted by turning the stud in the clevis 120. A thread blocking agent may be applied to prevent the stud from turning during other adjustments.

Returning to FIG. 2, a strap 140 extends across each lever assembly opening 64 in the cover 32. The stud 130 of the corresponding lever assembly 36 extends through an opening 142 (FIG. 3) in the strap 140 and a nut 144 is installed to draw the shoulder 132 against the cover 32 to fasten the pressure pin 120 to the cover. As will be apparent to those skilled in the art, the pressure pins 120 are constructed and arranged to apply force to the pressure plate 34 for clamping the friction disc 46 between the pressure plate and flywheel 48. As will be appreciated by those skilled in the art, the pressure pin lengths can be adjusted to account for clutch wear. A pillar 146 is mounted on each end of the strap 140 as shown in FIGS. 2 and 3 and extends along each lever assembly opening 64 to separate the cover 32 from the adjacent lever support 44 and reinforce the opening in the cover. The strap 140 and pillars 146 may be made from steel to prevent wear around the openings 64 in the aluminum cover 32. Thus, the strap 140 and/or pillars 146 constitute a liner for preventing wear around the openings 64. As will be apparent to those skilled in the art, the strap 140 and pillars 146 are captured by the nut 144 so they are held in the cover 32. In one design, the insert is machined (e.g., laser cut) from precision ground steel plate. It is envisioned an alternate design could incorporate sintered powder metal.

The clutch assembly 20 described above has two friction discs 46, but fewer or more discs may be used without departing from the scope of the present invention. The addition of discs increases the torque capacity of the clutch assembly. A floater or intermediate plate is provided between each pair of discs. The intermediate plates are connected to the flywheel so they turn in unison with the flywheel but are free to move axially with the discs.

Those skilled in the art will understand how to assemble the clutch described above. The clutch assembly operates in a conventional manner.

The cover assembly 30 described above is capable of enduring substantial reaction forces applied by the levers 40 and springs 92 to provide an improved operational lifespan. The cover assembly 30 also minimizes deflection relative to the flywheel 48. Further, the cover assembly 30 has a lower weight than many conventional cover assemblies, providing decreased inertia. In addition, the pressure plate 34 and cover 32 are shielded from abrasion and configured to reduce warping, cracking, and failure.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A centrifugal clutch assembly, comprising:
   a cover adapted for connecting to a driving member, said cover extending along a central axis;
   a pressure plate coaxially mounted on the cover for axial movement relative to the cover;
   a friction disc adapted for connection to a driven member, said friction disc being coaxially mounted adjacent the pressure plate;
   a first lever support bolted to the pressure plate, said first lever support having a hardness greater than the pressure plate;
   a second lever support spaced from the first lever support and bolted to the pressure plate, said second lever support having a hardness greater than the pressure plate; and
   a lever positioned between the first and second lever supports, said lever being pivotally mounted on the first and second lever supports and reacting against the cover to move the pressure plate into and out of engagement with the friction disc.

2. A centrifugal clutch assembly as set forth in claim 1, wherein the lever support comprises steel and the pressure plate comprises aluminum.

3. A centrifugal clutch assembly as set forth in claim 1, wherein the first and second lever supports are identically shaped.

4. A centrifugal clutch assembly as set forth in claim 3, further comprising a pin spanning between the first and second lever supports, said lever being pivotally supported by the pin.

5. A centrifugal clutch assembly as set forth in claim 4, further comprising a pressure pin fastened to the cover and pivotally connected to the lever with a clevis pin, said clevis pin being captured between the first and second lever supports to retain the clevis pin with the lever and pressure pin.

6. A centrifugal clutch assembly, comprising:
   a cover adapted for connecting to a driving member, said cover extending along a central axis;
   a pressure plate coaxially mounted on the cover for axial movement relative to the cover;
   a friction disc adapted for connection to a driven member, said friction disc being coaxially mounted adjacent the pressure plate;
   a lever support mounted on the pressure plate, said lever support having a hardness greater than the pressure plate;
   a lever pivotally mounted on the lever support and reacting against the cover to move the pressure plate into and out of engagement with the friction disc;
   wherein the cover has an opening through which the lever extends, and the clutch assembly further comprises a liner at least partially surrounding the opening and having a hardness greater than the cover.

7. A centrifugal clutch assembly as set forth in claim 6, wherein the liner comprises steel and the cover comprises aluminum.

8. A centrifugal clutch assembly as set forth in claim 6, wherein the lever support is bolted to the pressure plate.

9. A centrifugal clutch assembly, comprising:
   a cover adapted for connecting to a driving member, said cover extending along a central axis;
   a pressure plate coaxially mounted on the cover for axial movement relative to the cover;
   a friction disc adapted for connection to a driven member, said friction disc being coaxially mounted adjacent the pressure plate;
   a lever support mounted on the pressure plate, said lever support having a hardness greater than the pressure plate;
   a lever pivotally mounted on the lever support and reacting against the cover to move the pressure plate into and out of engagement with the friction disc;
   wherein the cover has an opening through which the lever extends, and the clutch assembly further comprises a liner at least partially surrounding the opening and having a bending strength greater than the cover where the liner surrounds the opening.

10. A centrifugal clutch assembly as set forth in claim 9, wherein liner comprises opposing pillars mounted on opposite sides of the opening in the cover, and a strap bridging the pillars and spanning the opening in the cover.

11. A centrifugal clutch assembly, comprising:
    a cover adapted for connecting to a driving member, said cover extending along a central axis and having an opening therein;
    a pressure plate coaxially mounted on the cover for axial movement relative to the cover, said pressure plate having a lever support extending therefrom;
    a friction disc adapted for connection to a driven member, said friction disc being coaxially mounted adjacent the pressure plate;

a lever extending through the opening in the cover, said lever pivotally mounted on the lever support of the pressure plate and reacting against the cover to move the pressure plate into and out of engagement with the friction disc;

opposing pillars mounted on opposite sides of the opening in the cover;

a strap bridging the pillars and spanning the opening in the cover; and a pressure pin fastened to the strap and pivotally connected to the lever.

12. A centrifugal clutch assembly as set forth in claim 11, wherein the opposing pillars have a hardness greater than the cover.

13. A centrifugal clutch assembly as set forth in claim 12, wherein the pillars comprise steel and the cover comprises aluminum.

14. A centrifugal clutch assembly as set forth in claim 11, wherein the strap has a bending strength greater than the cover where the strap spans the opening.

15. A centrifugal clutch assembly as set forth in claim 14, wherein the strap comprises steel and the cover comprises aluminum.

16. A centrifugal clutch assembly as set forth in claim 11, further comprising the pressure pin fastened to the strap and pivotally connected to the lever.

17. A centrifugal clutch assembly, comprising:

a cover adapted for connecting to a driving member, said cover extending along a central axis;

a pressure plate coaxially mounted on the cover for axial movement relative to the cover;

a friction disc adapted for connection to a driven member, said friction disc being coaxially mounted adjacent the pressure plate;

a lever support mounted on the pressure plate;

a lever pivotally mounted on the lever support and reacting against the cover to move the pressure plate into and out of engagement with the friction disc;

wherein the cover has an opening through which the lever extends, and the clutch assembly further comprises a liner at least partially surrounding the opening.

18. A centrifugal clutch assembly as set forth in claim 17, wherein the liner has a hardness greater than the cover.

\* \* \* \* \*